(12) United States Patent
Liling

(10) Patent No.: US 7,759,416 B2
(45) Date of Patent: Jul. 20, 2010

(54) METHOD FOR PRODUCING A WORK, JOINTING AND SURFACING COMPOUND FOR STRUCTURAL ELEMENTS AND ITS METHOD OF PREPARATION

(75) Inventor: Claude Liling, Reims (FR)

(73) Assignee: Lafarge Platres, Avignon (FR)

( * ) Notice: Subject to any disclaimer, the term of this patent is extended or adjusted under 35 U.S.C. 154(b) by 252 days.

(21) Appl. No.: 11/579,449

(22) PCT Filed: May 4, 2005

(86) PCT No.: PCT/FR2005/001127

§ 371 (c)(1),
(2), (4) Date: Apr. 30, 2007

(87) PCT Pub. No.: WO2005/121040

PCT Pub. Date: Dec. 22, 2005

(65) Prior Publication Data

US 2007/0232736 A1 Oct. 4, 2007

(30) Foreign Application Priority Data

May 4, 2004 (EP) .................................. 04291141

(51) Int. Cl.
*C08K 5/34* (2006.01)
*C08K 3/26* (2006.01)
(52) U.S. Cl. ...................... 524/100; 524/425
(58) Field of Classification Search ................ 524/100
See application file for complete search history.

(56) References Cited

U.S. PATENT DOCUMENTS

| 4,304,704 A | | 12/1981 | Billings |
| 4,686,253 A | * | 8/1987 | Struss et al. ................... 524/44 |
| 4,743,475 A | * | 5/1988 | Negri et al. .................. 427/387 |
| 5,336,318 A | | 8/1994 | Attard et al. |
| 6,105,325 A | | 8/2000 | Zuber et al. |
| 2003/0084633 A1 | | 5/2003 | Zuber et al. |
| 2003/0153651 A1 | * | 8/2003 | Bonetto et al. ................... 524/2 |
| 2004/0092614 A1 | * | 5/2004 | Hilton et al. ................... 521/82 |
| 2004/0216424 A1 | | 11/2004 | Zuber et al. |
| 2004/0237436 A1 | | 12/2004 | Zuber et al. |
| 2004/0259995 A1 | * | 12/2004 | Fitzgerald ................... 524/425 |

FOREIGN PATENT DOCUMENTS

| EP | 0 681 998 B1 | 11/1995 |
| WO | 97/02395 A1 | 1/1997 |
| WO | 00/47682 A1 | 8/2000 |
| WO | 02/06183 A1 | 1/2002 |
| WO | 03/027038 A1 | 4/2003 |
| WO | 03/059838 A1 | 7/2003 |

OTHER PUBLICATIONS

English translation of International Preliminary Report on Patentability issued in corresponding International Application No. PCT/FR2005/001127, 2006.
International Search Report dated Sep. 9, 2005.
International Preliminary Report on Patentability, 2006.
European Search Report dated Nov. 26, 2004 (with English translation of category of cited documents).

* cited by examiner

*Primary Examiner*—Ling-Siu Choi
*Assistant Examiner*—Hui Chin
(74) *Attorney, Agent, or Firm*—Buchanan Ingersoll & Rooney PC

(57) ABSTRACT

The invention relates to a sealant compound comprising, in weight percent relative to the compound total volume: 40-60% of mineral filler whose diameter d50 ranges from 5 to 20 microns, 5-10% of hydrophobic expanded perlite whose diameter d50 ranges from 20 to 100 microns and 4-20% of binder. A method for preparing the inventive compound is also disclosed. Said invention also relates to producing a work provided with joints made of pointing and/or surfacing compound by applying said compound and/or pointing and surfacing by applying the compound which is characterised in that the compound is applied by airless process. According to the inventive method, said sealant compound is embodied such as described in the invention.

17 Claims, No Drawings

METHOD FOR PRODUCING A WORK, JOINTING AND SURFACING COMPOUND FOR STRUCTURAL ELEMENTS AND ITS METHOD OF PREPARATION

FIELD OF THE INVENTION

The present invention relates to a jointing and surfacing compound for structural elements, particularly paper-faced plasterboards, and to a method of producing a work such as a partition, a wall covering or a ceiling.

TECHNOLOGICAL BACKGROUND

It is well known to use plasterboards for producing partitions, coverings for vertical or inclined elements, or for producing ceilings, whether suspended or not.

These plasterboards generally consist of a core, essentially made of plaster, covered on each of its sides with a sheet which serves both as reinforcement and as facing and which may consist of paperboard or mineral fibers.

In general, plasterboards are assembled with a first compound and the joints between the plasterboards are finished with a complementary compound. A filling compound is used together with a tape, and in general this has a relatively small shrinkage and good bonding and adhesion to the jointing tape. A finishing compound is used during the last pass in order to finish the work so that it has a monolithic surface. According to application WO-A-97/02395, the compound has the same color as the facing paper of the plasterboard.

Various operators involved in producing a work on a site are in general the plasterer, who positions the plasterboards, the jointer, who prepares the joints between plasterboards (often the jointer and the plasterer are one and the same, while sometimes the jointer and the painter are one and the same) and the painter, who decorates (in general after a printing or primer layer has been applied, except in the case of the aforementioned application WO-A-97/02395). At the present time, painters generally use paints that are applied by means of a spray nozzle, using what is called an "airless" system, namely a container located several tens of meters from the point of application and a single hose with a spray gun fitted with a nozzle on the end, the whole being airless. This has many advantages for storage between work sites, etc. In general, the pressure used is between 120 and 200 bar.

In many cases, the painter, responsible for the final appearance, has to come back to the joints between the plasterboards and treat them again.

There is therefore a need for a compound that can be applied by the same person and/or the same airless equipment and that is suitable for jointing, both for filling and finishing, and for surfacing.

SUMMARY OF THE INVENTION

One subject of the invention is therefore a compound comprising, in percentages by weight relative to the total weight of compound:
- 40 to 60% of a mineral filler having a diameter $d_{50}$ of between 5 and 20 microns;
- 5 to 10% of hydrophobic expanded perlite having a diameter $d_{50}$ of between 20 and 100 microns; and
- 4 to 20% of a binder.

EMBODIMENTS OF THE COMPOUND

The subject of the invention is also a method of preparing the compound according to the invention.

The subject of the invention is also a method of producing a work, comprising the jointing with a compound and/or the surfacing by applying a compound, and/or the jointing and surfacing by applying a compound, characterized in that the compound is applied by the airless technique. According to one embodiment, the compound is as described in the present application.

Another subject of the present invention is therefore a method of producing a work, comprising the juxtaposition of structural elements, possibly the filling of the gap between the structural elements by means of a filling compound, the application of a tape, the covering of the tape by means of a finishing compound (possibly with filling by means of a filling compound) and being characterized in that the compound according to the invention is used as finishing compound.

Yet another subject of the invention is a method of producing a work, comprising the surfacing of structural elements by using the compound according to the invention.

Yet another subject of the invention is a method of producing a work combining the above two subjects according to the invention.

Another subject of the invention is a method of producing a work, comprising the juxtaposition of paper-faced plasterboards, optionally the application of a tape, the covering of the joint between the plasterboards by means of a delayed-setting compound, characterized in that the compound is applied by the airless technique.

Other features and advantages of the invention will now be described in detail in what follows.

DETAILED DESCRIPTION OF THE INVENTION

Compound According to the Invention

The compound according to the invention comprises, as was indicated, the following components (in % by weight relative to the total weight of the compound):
- 40 to 60%, preferably 40 to 50%, of a mineral filler having a diameter $d_{50}$ of between 5 and 20 microns, preferably between 10 and 15 microns;
- 5 to 10%, preferably 6 to 7.5%, of hydrophobic expanded perlite having a diameter $d_{50}$ of between 20 and 100 microns, preferably between 30 and 70 microns; and
- 4 to 20%, preferably 5 to 10%, of a binder.

The balance comprises water and possibly other components.

As mineral filler, it is possible to use any mineral filler normally employed for the manufacture of a jointing compound. This is in general a mineral filler of light color, preferably white, the mean diameter $d_{50}$ (by weight) of which is generally between 5 and 20 microns, so that the compound after being dried gives a smooth surface and can be easily pumped by an airless machine. Examples of appropriate $d_{50}$ are 10 and 15 microns.

As examples of mineral fillers, mention may be made of calcium carbonate, anhydrous calcium sulfate or calcium sulfate dehydrate, magnesium carbonate, dolomite, silicas, silicates, aluminates or other substances.

Preferably, calcium carbonate $CaCO_3$ is used.

The hydrophobic expanded perlite has a $d_{50}$ (by weight) of between 20 and 100 microns. The bulk density of this perlite is preferably greater than 100 kg/m$^3$. The $d_{50}$ of the particles is generally between 20 and 100 microns, preferably 35 to 70 microns. This perlite is known and may for example be Noblite®, G50, G100, G200, G400 or Sil-Cell®. Without being tied to one theory, the Applicant believes that the small size of the particles and/or a relatively small specific surface area (compared with a size of 150 microns and higher and/or a large specific surface area in the case of "conventional" perlite) makes it possible to avoid crushing the particles. This affords the possibility of using an airless method.

The binder used is one that is conventionally used in the field of compounds and is dispersible in an aqueous phase. It may be in the form of a dry extract or for example in the form of a 50% latex in water. As examples of such binders, mention may be made of polyvinyl alcohol homopolymers, polyvinyl acetate homopolymers (plasticized or unplasticized), ethylene/vinyl acetate copolymers (plasticized or unplasticized EVAs), ethylene/vinyl versatate copolymers, vinyl acetate/vinyl versatate copolymers, polyacrylics, vinyl acetate/acrylic copolymers, styrene/acrylic copolymers, styrene/butadiene copolymers, vinyl acetate/vinyl versatate/vinyl maleate terpolymers, vinyl acetate/vinyl versatate/acrylic terpolymers, terpolymers of vinyl acetate with a vinyl ester of a long-chain acid and with an acrylic acid ester, acrylic terpolymers and blends thereof. It will be preferable to use two or more binders, one dedicated more specifically to water repellency and the other dedicated more particularly to plasticity. It will thus be possible to use combinations of binders: vinyl acetate co- or terpolymer/vinyl copolymer and vinyl copolymer/styrene copolymer/acrylic. When these polymers are supplied, they are either in the form of powder or in the form of a dispersion in water (generally with a content of about 50%).

The proportion of organic binder is preferably between 5 and 10% of the total weight of the compound.

Apart from the components indicated above, the compound generally includes one or more of the following other components:
  a slip agent in an amount for example of 0.5 to 10%, preferably 1 to 5%. This slip agent may be a silicate-based agent (different from the mineral filler), especially a clay of the attapulgite type, or it may be any known slip agent, for example talc, mica or a stearate, especially zinc stearate;
  a workability agent, which is a water-retaining and thickening agent, in an amount for example of 1 to 15%. This water-retaining agent may be methyl hydroxyethyl cellulose;
  an antifoam agent, in an amount for example of 1 to 15%. This antifoam agent is for example a nonionic surfactant;
  a silicone derivative, in an amount for example of 1 to 15%. This silicone derivative serves for example as pH buffer in order to obtain a basic medium and/or as viscosity regulator and/or for allowing better stripping, and it may be chosen from siliconates, silanes, hydrogenated silicone oils, silicone emulsions, amino silicone emulsions, alkylsiloxane resins, such as hydrogenomethylpolysiloxane and aminated polydimethylsiloxane, and blends thereof, preferably siliconates;
  biocides;
  pigments and optical brighteners;
  dispersing agents;
  antigel agents;
  etc.

A preferred compound according to the invention may comprise, in percentages by weight relative to the total weight of compound:
  40 to 50% of calcium carbonate having a diameter $d_{50}$ of between 5 and 20 microns, preferably between 10 and 15 microns;
  5 to 10%, preferably 6 to 7.5%, of hydrophobic expanded perlite;
  5 to 10% of a binder;
  1 to 5% of a slip agent comprising a clay and/or a stearate;
  1 to 15% of a water-retaining agent;
  1 to 15% of an antifoam agent; and optionally
  1 to 15% of a silicone derivative, preferably a siliconate.

The compound according to the invention has a density generally between 0.9 and 1.3, preferably between 1 and 1.25 and more preferably 1.15 to 1.21.

The compound generally has a yield point, that is to say its viscosity decreases when a shear is applied and rises again when the shear is removed. This allows it to be applied using the airless technique. The Brookfield viscosity of the compound on leaving the spray nozzle is for example between 0.2 and 0.6 times, preferably between 0.25 and 0.35 times the original value. The viscosity is measured by a Helipath device (from Labomat) (S96 spindle at 10 rpm; 1 min). The values after the compound has rested for 24 hours may be between 150 000 cps and 1 500 000 cps, preferably between 250 000 cps and 1 200 000 cps and more preferably between 300 000 cps and 950 000 cps. The time for the yield point to be reestablished, namely the time between application and the moment when the compound recovers a viscosity close to its original viscosity, is generally between 1 and 120 min, preferably between 5 and 60 min.

The compound according to the invention has a pH that may be controlled by means of the buffer, which may bring the pH to basic values, for example 8 to 9.5.

The compound according to the invention has a solids content that may vary, for example from 50 to 70%, preferably 53 to 67%. Depending on the use, it may be preferable to have relatively high values of this solids content. For an application as jointing, the upper half of the range will be preferred, whereas for a surfacing application, the lower half of the range will be preferred.

The compound according to the invention has one or more of the following properties:
  it has good adhesion to the paper constituting the facing of the plasterboard—in fact it is the plasterboard that undergoes cohesive failure;
  it has good adhesion to a facing of the glass fiber type in order to allow direct application without depositing the facing on renovation work sites;
  it allows good bonding and adhesion of the jointing tape;
  it has a color identical to that of the facing paper;
  it has a negligible shrinkage after drying (for example less than 20%, as determined by the ring test);
  it has a water absorption "close" to that of the facing paper, so as to avoid having to use a layer of primer before applying a wallpaper or paint, according to the teaching of the aforementioned application WO-A-97/02395;
  it allows moderate adhesion of the paper constituting the wallpaper, so that one or more subsequent stripping operations are possible;
  it allows easy paint application (even when the compound is used as sole jointing compound);
  it offers a surface rendition substantially identical to that of the printing primer layer normally used in the field of interior constructions; and
  it allows texturing after application.

Method of Preparing the Compound According to the Invention

The compound according to the invention may be prepared by mixing its constituents in any order, or in a chosen order, or according to a particular method that gives good results.

In the first case, the various components are added to the water with stirring.

In the second case, it will be preferable to add the hydrophobic expanded perlite first, preferably in the presence of a foaming agent, and then secondly to add the other components. Water may be added at the end in order to adjust the viscosity, where appropriate.

In the third case, one part of the filler (typically 5 to 10% by weight) is premixed with other components that may be difficult to disperse in water, for example the slip agent and/or the pigments. As an example, it will be possible to use a premix consisting of the filler, the slip agent, the workability agent and optionally a binder in powder form. Preferably, the mineral filler is added before the premixing and the binder afterwards. Water may be added at the end to adjust the viscosity, where appropriate.

Any type of mixer, preferably a horizontal mixer with a staged feed, is used.

Methods of Construction According to the Invention

The compound according to the invention may be used for producing many types of work, such as partitions, wall coverings or ceilings, whether suspended or not, from plasterboards. The compound may also be used on other surfaces, for example concrete surfaces, especially when the buffer for basic pH is present.

The compound according to the invention is particularly suitable for the production of a work using paper-faced plasterboards.

The compound according to the invention is preferably used airlessly, but it is also possible to use it as a conventional compound.

The compound according to the invention may be used as only a jointing compound or as a surfacing compound or both.

The production of a work by means of plasterboards generally comprises the juxtaposition of plasterboards, the filling of the gap between the plasterboards by means of a filling compound, the application of a tape, the covering of the tape by means of the filling compound and then the covering of the filling compound with a finishing compound. The compound according to the invention may be the filling compound and/or the finishing compound. When the compound according to the invention is used for treating the joint, the operator proceeds as follows. The compound according to the invention is applied, to a tape applied in the feathered edges, by airless spraying in line with the joint (using an appropriate nozzle), and then, a few minutes after its application (when the viscosity has risen), the operator closes up the joint. If the operator has only one joint to do, he will then proceed to a second application of the compound (or another compound according to the invention more particularly dedicated to finishing) and to a final smoothing operation. If the operator has to coat the entire surface, he may then apply over the entire surface one and the same surfacing compound without beforehand having to finish off the joint. In this case, the jointing and surfacing compounds may be identical or different.

To produce joints for the feathered edges, it will be preferable to use a self-adhesive glass mesh tape, without a prior filling layer. To produce joints on round-edged plasterboards, and therefore without a tape, the compound is used in the same manner.

Depending on the desired level of finishing, it is possible to deposit, for the surfacing or printing, a film of compound using a wide-jet nozzle.

The compound according to the invention makes it possible to carry out an operation, the surfacing and/or the printing. After application, the compound may be structured using a spatula, a smoothing tool, a plastic embossed roller or any other instrument, depending on the desired relief (spatulated relief, rolled relief, rolled-compressed relief, etc.).

In the case of surface renovation of the type with a glass-fiber-based facing, the compound according to the invention offers adhesion to glass fibers that is sufficient to avoid having to carry out any surfacing or prior deposition of the facing.

One of the main features of the compound according to the invention is its ability to be sprayed by an airless system, the equipment used by painters in particular. These systems offer advantages of robustness, simplicity of use (compressor outside a room with a single hose into the room, no drying of the product since it is airless, etc.). The invention therefore provides a jointing and/or surfacing method using a drying compound based on a mineral filler and binder by spraying using the airless technique. This airless technique uses high pressures, up to 200 bar. All airless machines are suitable, especially M-Tec® forte, Graco® Spackmax®, Elmyggan®, etc.

The compound according to the invention therefore makes it possible to save a considerable amount of time and labor.

The invention is also applicable in the field of delayed-setting compounds, the airless technique being applicable to these compounds. Such delayed-setting compounds are compounds based on plaster (hemihydrate), but which include a setting retarder. Among such setting retarders, mention may be made of maleic anhydride, sodium polyacrylate and polyacrylic acids, and also proteinaceous mixtures available under the name Goldbond High Strength Retarder. The amount is for example from 0.1 to 1% by weight relative to the weight of the hemihydrate. It is also possible to use an accelerator, which is then injected into the mix at the spray nozzle. As accelerator, it is possible to use aluminum sulfate, aluminum nitrate, ferric nitrate, ferric sulfate, ferric chloride, ferrous sulfate, potassium sulfate, sodium carbonate or sodium bicarbonate, aluminum sulfate generally being preferred. The amount may for example vary between 1 and 5% by weight relative to the weight of the hemihydrate.

The additives mentioned above may also be used in the case of the setting compound. In particular, polyvinyl alcohol may be used.

Examples of such compositions are given for example in WO-A-03/027038 and WO-A-03/059838.

EXAMPLES

The following examples are given merely by way of illustration and in no way imply a limiting character. The viscosity is measured at the mixer exit and optionally after resting. In the examples, the following components were used:

| Component | Characteristics | |
|---|---|---|
| Perlite 1 | Water-repellent expanded perlite ($d_{50}$ = 50 microns) | |
| Perlite 2 | Water-repellent expanded perlite ($d_{50}$ = 70 microns) | |
| Perlite 3 | Water-repellent expanded perlite ($d_{50}$ = 50-60 microns) | |
| $CaCO_3$ 1 | $d_{50}$ = 10 microns | |
| $CaCO_3$ 2 | $d_{50}$ = 15 microns | |
| Premix 1 | $CaCO_3$ 2 | 44.8% |
| | Cellulose ether | 8.8% |
| | Attapulgite | 32% |
| | $TiO_2$ | 14.4% |
| Premix 2 | $CaCO_3$ 2 | 31.08% |
| | Cellulose ether | 2.70% |
| | Attapulgite | 20.72% |

-continued

| Component | Characteristics | |
|---|---|---|
| | Zinc stearate | 4.73 |
| | Binder 3 | 31.08% |
| | TiO$_2$ | 9.69% |
| Binder 1 | Vinyl acetate/ethylene copolymer dispersed in water | |
| Binder 2 | Styrene/acrylic copolymer dispersed in water | |
| Binder 3 | Vinyl acetate/vinyl ester of a long-chain acid/acrylic acid ester terpolymer dispersed in water | |

To prepare the compounds, the procedure was as follows, using a horizontal mixer. The perlite was added to the starting water, with stirring for 2 minutes. Next, the biocide and the antifoam were added, followed by the mineral filler. Next, the premix was added, then the binder or binders and finally the process was completed with the viscosity-adjusting water, possibly with the siliconate.

Example 1

The following composition 1 was prepared:

| Component | Quantity |
|---|---|
| Starting water | 1600 |
| Perlite 1 | 250 |
| Biocide | 15 |
| Antifoam | 10 |
| CaCO$_3$ 1 | 1630 |
| Premix 1 | 250 |
| Binder 1 | 140 |
| Binder 2 | 140 |
| Adjustment water | 100 |

The following characteristics were obtained:

| pH | 7.8 |
|---|---|
| Density | 1.2 |
| Viscosity | 360 000 cps |
| % solids content | 55.80% |

Example 2

The following composition 2 was prepared:

| Component | Quantity |
|---|---|
| Starting water | 1978 |
| Perlite 1 | 321.5 |
| Biocide | 18.5 |
| Antifoam | 12 |
| CaCO$_3$ 1 | 2015 |
| Premix 1 | 309 |
| Binder 1 | 173 |
| Binder 2 | 173 |

The following characteristics were obtained:

| pH | 8.36 |
|---|---|
| Density | 1.007 |
| Viscosity | 324 000 cps* |
| % solids content | 59.49% |

*Value after resting: 911 000 cps.

Example 3

The following composition 3 was prepared:

| Component | Quantity |
|---|---|
| Starting water | 51.4 |
| Perlite 1 | 8.36 |
| Biocide | 0.48 |
| Antifoam | 0.3 |
| CaCO$_3$ 1 | 52.4 |
| Premix 1 | 8 |
| Binder 1 | 4.5 |
| Binder 2 | 4.5 |
| Adjustment water | 6 |

The following characteristics were obtained:

| pH | 8.26 |
|---|---|
| Density | 1.11 |
| Viscosity | 214 000 cps* |
| % solids content | 54.67% |

*Value after resting: 826 000 cps.

Example 4

The following composition 4 was prepared:

| Component | Quantity |
|---|---|
| Starting water | 58.5 |
| Perlite 3 | 9.765 |
| Biocide | 0.555 |
| Antifoam | 0.375 |
| CaCO$_3$ 2 | 61.2 |
| Premix 1 | 9.39 |
| Binder 1 | 5.257 |
| Binder 2 | 5.257 |

The following characteristics were obtained:

| pH | 8.86 |
|---|---|
| Density | 1.25 |
| Viscosity | 202 000 cps |
| % solids content | 53.95% |

Example 5

The following composition 5 was prepared:

| Component | Quantity |
|---|---|
| Starting water | 50 |
| Perlite 1 | 8.36 |
| Biocide | 0.48 |
| Antifoam | 0.3 |
| CaCO$_3$ 1 | 52.4 |
| Premix 1 | 8 |
| Binder 1 | 4.5 |
| Binder 2 | 4.5 |
| Adjustment water | 7.4 |

The following characteristics were obtained:

| | |
|---|---|
| pH | 8.54 |
| Density | 1.108 |
| Viscosity | 220 000 cps |
| % solids content | 54.3% |

Example 6

The following composition 6 was prepared:

| Component | Quantity |
|---|---|
| Starting water | 38 |
| Perlite 3 | 7.8 |
| Biocide | 0.4 |
| Antifoam | 0.3 |
| $CaCO_3$ 2 | 49.4 |
| Premix 2 | 11.1 |
| Binder 1 | 4.2 |
| Adjustment water | 2 |

The following characteristics were obtained:

| | |
|---|---|
| pH | 8.22 |
| Density | 1.21 |
| Viscosity | 225 000 cps |
| % solids content | 63.1% |

Example 7

The following composition 7 was prepared:

| Component | Quantity |
|---|---|
| Starting water | 38 |
| Perlite 2 | 7.4 |
| Biocide | 0.65 |
| Antifoam | 0.3 |
| $CaCO_3$ 2 | 49.4 |
| Premix 2 | 11.7 |
| Binder 1 | 4.2 |

The following characteristics were obtained:

| | |
|---|---|
| pH | 7.8 |
| Density | 1.208 |
| Viscosity | 248 000 cps |
| % solids content | 62.88% |

Example 8

The following composition 8 was prepared:

| Component | Quantity |
|---|---|
| Starting water | 3800 |
| Perlite 2 | 740 |
| Biocide | 59 |
| Antifoam | 30 |
| $CaCO_3$ 2 | 4940 |
| Premix 2 | 1163 |
| Binder 1 | 420 |
| Siliconate | 53 |

The following characteristics were obtained:

| | |
|---|---|
| pH | 11.87 |
| Density | 0.910 |
| Viscosity | 73 000 cps* |
| % solids content | 63.96% |

*Value after resting: 250 000 cps.

Example 9

The following composition 9 was prepared:

| Component | Quantity |
|---|---|
| Starting water | 84 |
| Perlite 3 | 15.6 |
| Biocide | 1.282 |
| Antifoam | 0.6 |
| $CaCO_3$ 2 | 98.8 |
| Premix 2 | 23.3 |
| Binder 1 | 8.4 |

The following characteristics were obtained:

| | |
|---|---|
| pH | 7.85 |
| Density | 1.090 |
| Viscosity | 175 000 cps* |
| % solids content | 63.7% |

*Value after resting: 317 000 cps.

Example 10

The following composition 10 was prepared:

| Component | Quantity |
|---|---|
| Starting water | 48.5 |
| Perlite 3 | 10.44 |
| Blue brightener | 0.015 |
| Biocide | 0.675 |
| Antifoam | 0.4 |
| $CaCO_3$ 2 | 66.150 |
| Premix 2 | 15.5 |
| Binder 1 | 5.58 |
| Siliconate | 0.74 |

The following characteristics were obtained:

| | |
|---|---|
| pH | 9.03 |
| Density | 1.125 |
| Viscosity | 95 000 cps* |
| % solids content | 65.71% |

*Value after resting: 195 000 cps.

Example 11

The following composition 11 was prepared:

| Component | Quantity |
| --- | --- |
| Starting water | 58.3 |
| Perlite 1 | 9.65 |
| Biocide | 0.675 |
| Antifoam | 0.38 |
| CaCO$_3$ 1 | 60.5 |
| Premix 1 | 9.27 |
| Binder 1 | 5.2 |
| Binder 2 | 5.2 |

The following characteristics were obtained:

| | |
| --- | --- |
| pH | 8.5 |
| Density | 1.100 |
| Viscosity | 235 000 cps |
| % solids content | 54.25% |

Example 12

Joints were produced by spraying using an M-Tec airless machine with 25 m of 19 mm hose and 15 m of 15 mm hose, i.e. a total of 40 m in length. The nozzle had a 60° angle and a 0.051 inch opening.

After bonding the glass mesh at the joint, the spraying of compound 10 from a distance of 30 cm and then straightening the treated joints a few minutes after application resulted in high-quality joints.

The method then involved spraying on plasterboards with joints already treated. The same tools were used, but this time compound 11 was sprayed so as to form a sprayed band 70 cm in width. Without smoothing, a granite-like decorative compound was obtained direct from spraying. Smoothing the spraying compound posed no problem.

The invention claimed is:

1. A method of producing a work, comprising juxtaposition of paper-faced plasterboards, optionally application of a tape, covering of the joint between the plasterboards by means of a drying compound applied by an airless technique, wherein the drying compound comprises, in percentages by weight relative to the total weight of the compound:
   40 to 50% of a mineral filler having a diameter $d_{50}$ of between 10 and 15 microns;
   5 to 10% of hydrophobic expanded perlite having a diameter $d_{50}$ of between 20 and 100 microns;
   4 to 20% of a binder;
   0.5 to 10% of a slip agent comprising a clay and/or talc and/or mica and/or a stearate;
   1 to 15% of a water-retaining agent that is a cellulose derivative; and
   1 to 15% of an antifoam agent,
   wherein the compound has an apparent density of between 1 and 1.25, and a Brookfield viscosity of the compound on leaving a spray nozzle is between 0.2 and 0.6 times an original Brookfield viscosity value of the compound.

2. The method of claim 1, the compound comprising:
   40 to 50% of the mineral filler;
   6 to 7.5% of the hydrophobic expanded perlite; and
   5 to 10% of the binder.

3. The method of claim 1, in which the hydrophobic expanded perlite has a $d_{50}$ of between 30 and 70 microns.

4. The method of claim 1, in which the binder is chosen from polyvinyl alcohol homopolymers, polyvinyl acetate homopolymers (plasticized or unplasticized), ethylene/vinyl acetate copolymers (plasticized or unplasticized EVAs), ethylene/vinyl versatate copolymers, vinyl acetate/vinyl versatate copolymers, polyacrylics, vinyl acetate/acrylic copolymers, styrene/acrylic copolymers, styrene/butadiene copolymers, vinyl acetate/vinyl versatate/vinyl maleate terpolymers, vinyl acetate/vinyl versatate/acrylic terpolymers, acrylic terpolymers and blends thereof.

5. The method of claim 1, in which the antifoam agent is a nonionic surfactant.

6. The method of claim 1, wherein the compound further includes:
   a silicone derivative, in an amount of 1 to 15%.

7. The method of claim 6, in which the silicone derivative is a siliconate.

8. The method of claim 1, wherein the compound comprises:
   40 to 50% of calcium carbonate having a diameter $d_{50}$ of between 10 and 15 microns;
   5 to 10% of hydrophobic expanded perlite having a diameter $d_{50}$ of between 30 and 70 microns;
   5 to 10% of the binder;
   1 to 5% of a slip agent comprising a clay and/or a stearate;
   1 to 15% of the water-retaining agent;
   1 to 15% of the antifoam agent; and optionally
   1 to 15% of a silicone derivative.

9. The method of claim 1, in which the density of the compound is between 0.9 and 1.3 kg/m$^3$.

10. The method of claim 1, in which the viscosity of the compound after resting for 24 hours may be between 150 000 cps and 1 500 000 cps.

11. The method of claim 1, in which the viscosity under shear of the compound is equal to 0.2 to 0.6 times the viscosity without shear.

12. The method of claim 1, in which the time for the yield point to recover has a characteristic time of between 1 and 120 min.

13. The method of claim 1, the compound having a solids content of 50 to 70%.

14. The method of claim 1, in which the constituents of the compound are mixed in any order.

15. The method of claim 1, in which the perlite is mixed first and then the other components.

16. The method of claim 1, in which part of the mineral filler is premixed with at least part of the components that are difficult to disperse.

17. The method of claim 1, which includes a surfacing additional step by applying a second drying compound based on a filler and a binder, characterized in that the first and second compounds are applied by the airless technique.

* * * * *